Patented Dec. 25, 1951

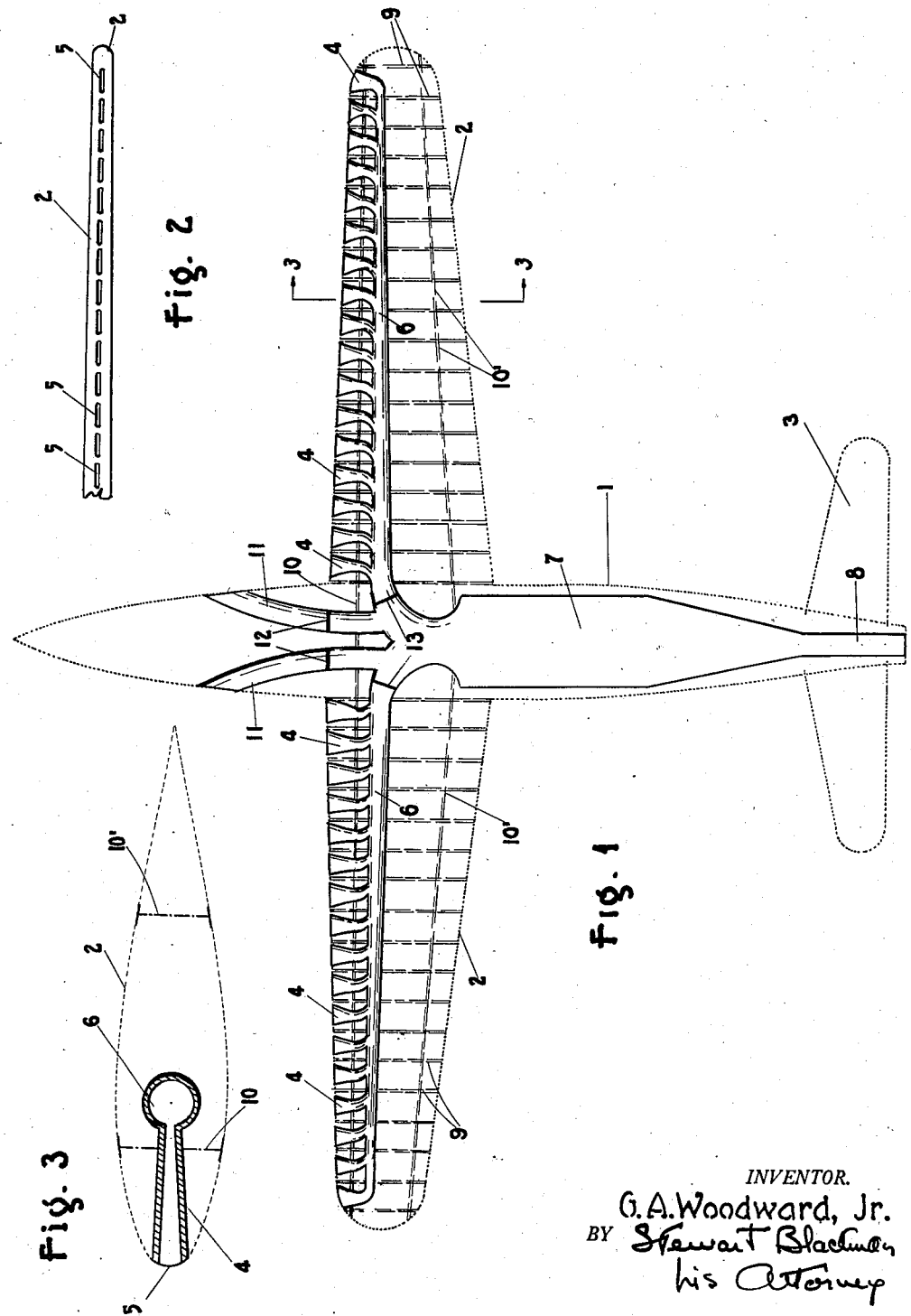

2,580,339

UNITED STATES PATENT OFFICE 2,580,339

BOUNDARY LAYER CONTROL AND INTAKE SYSTEM FOR AIRCRAFT

George A. Woodward, Jr., Miami Springs, Fla.

Application March 19, 1949, Serial No. 82,461

4 Claims. (Cl. 244—15)

The invention relates to an improvement in jet propelled aircraft and, more particularly, to a duct system for delivery of intake air to the compressor, or like receiving unit, of an aircraft's propulsion engine.

An object of the invention is to provide an air duct system of the character and for the purpose described which will be simple in construction and efficient in operation.

Another object is to provide an air duct system capable of minimizing drag on an airfoil during relatively high speed flight.

A further object is to provide an air duct system which may be readily and economically incorporated within the structural assembly of the aircraft.

Other advantages of the invention will be discernible from the description thereof hereinafter set forth.

According to the invention, the wing portions of the aircraft are slotted intermediate the ribs thereof for along substantially the entire leading edges thereof to define a plurality of horizontally elongated air inlets forming the frontal termini of a corresponding plurality of intake tubes. These tubes discharge into a common manifold extending along each wing and connected by a central bifurcated fitting for the delivery of intake air to the air receiving unit of the propulsion engine.

Embraced within the main air duct system, is an auxiliary or alternate source air intake system which is controllable to supply direct ram air to the propulsion unit during take-off, climb, and landing, whereby to obtain maximum lift from wing portions during relatively slow speed flight.

The invention is embodied in an aircraft exemplified in the accompanying drawing, in which the views are as follows, like reference numerals designating identical parts throughout the several views:

Fig. 1, a dotted line outline in plan of the aircraft with the duct system disposed therein;

Fig. 2, a partial elevation of a wing portion along the leading edge thereof; and Fig. 3, a section along line 3—3, of Fig. 1.

An aircraft to which the invention may be applied is illustrated in general outline in Fig. 1, wherein is shown a fuselage 1, wing or airfoil portions 2, and tail assembly 3.

Arranged within the wing structure on each side of the fuselage is a plurality of forwardly directed air intake tubes 4, terminating at their front or intake ends in horizontally elongated slots 5. These tubes are flared forwardly thereof and rearwardly thereof they discharge into a common manifold 6 which extends along each wing, meeting in a central bifurcated fitting to direct the flow of air rearwardly for delivery to a compressor, or like air receiving unit associated with the aircraft's propulsion engine located in the space shown, generally, at 7, from which propellant gases are discharged through an exhaust 8.

The intake tubes 4 are each positioned intermediate each pair of wing ribs 9 adjacent the sides of these tubes, being structurally secured in any suitable manner to ribs 9 and the front spar 10. A rear spar 10' for the usual reinforcement of the wing structure is likewise provided in this assembly.

Communicating with the manifolds 6 near the junction thereof centrally of the aircraft, and extending forwardly therefrom, is a pair of auxiliary air ducts 11 which terminate in intake scoops formed in the outer surface structure of the aircraft. These ducts have suitable valves shown generally at 12, which are controllable from the cockpit by means well known in the art, for a purpose to be presently explained. The manifolds 6 are likewise valved as shown, generally, at 13, these valves being controlled from the cockpit to isolate the main air duct system for a purpose to be hereinafter described.

In practice, the volume of air impinging against the leading edges of the airfoil during relatively high speed flight is greater than is required to impart lift to the aircraft. When a given critical speed is attained, the impinging air no longer follows the lamina flow or curvature of the airfoil but begins to "pile up" in front thereagainst. A resultant drag is thus imposed on the airfoil with accompanying undesirable effects of compressibility. By virtue of the slotted leading edges formed by incorporating the intake tubes in the wing structure as herein provided, a portion of the impinging air directed against the leading edges of the airfoil is absorbed through these slots 5, which are alined along that region where the boundary layer begins and, thus, no excessive quantities of air being present to build up against the leading edges, the drag effect upon the airfoil is materially reduced.

When taking off, climbing, or landing, manifold valves 13 are normally closed, isolating the air duct system supplied by intake tubes 4; valves 12 in the auxiliary system are opened and ram air drawn through ducts 11 to supply the engine. In relatively high speed flight, as will be understood, the main air duct system supplied from slots 5 is utilized by opening valves 13. It will be understood, of course, that adjustments may be made to both valves 12 and 13, in flight, to obtain flow from either the main, or auxiliary systems, or both.

I claim:

1. An air intake system for jet type aircraft including a pair of airfoil wings having a plurality of reinforcing ribs spaced spanwise thereof, comprising in combination with said aircraft, a plurality of forwardly directed intake tubes each positioned intermediate said ribs along the entire span of said wings and terminating at their forward ends in horizontally elongated slots finishing flush with the leading edge of said wings, whereby to permit the intake of air at relatively high pressure from the boundary layer along said wings to reduce drag thereon.

2. In a jet propelled aircraft having an air-receiving propulsion engine, the combination of airfoil wings including a plurality of spanwise spaced reinforcing ribs, a plurality of forwardly directed air induction nozzles interposed intermediate said ribs along substantially the entire span of said wings, said nozzle terminating at the forward ends thereof in horizontally elongated slots finishing flush with the leading edge of said wings for the induction of boundary layer air, common manifolds extending lengthwise of said wings and communicating with said nozzles for the reception of the air flow therefrom and said manifolds being curved at their inner ends to form a common bifurcated conduit for the direction of said air flow rearwardly of said aircraft to supply said engine, and valve means arranged in said manifolds.

3. In a jet propelled aircraft having airfoil wings including a plurality of spanwise spaced reinforcing ribs, and an air-receiving propulsion engine, the combination therewith of a plurality of forwardly directed air induction nozzles interposed each intermediate the ribs of said wings and terminating at their forward ends in horizontally elongated individual slots finishing flush with the leading edge of said wings for the induction of boundary layer air to minimize drag thereon, said nozzles and slots being arranged along the entire span of said wings, common manifolds extending lengthwise of said wings and communicating with said nozzles for the reception of air therefrom and said manifolds being curved at their inner ends to form a common bifurcated conduit for the direction of said air rearwardly of said aircraft for the supply of said engine, an auxiliary air intake conduit extending forwardly of said bifurcated conduit for the delivery of supplementary air thereto, and valve means arranged in said manifolds and said auxiliary conduit and operable to isolate said manifolds from air conducting association with said auxiliary conduit.

4. In a jet propelled aircraft having airfoil wings including a plurality of spanwise spaced reinforcing ribs, and an air-receiving propulsion engine, the combination therewith of a plurality of air induction nozzles each interposed between the ribs of said wings and terminating at their forward ends in horizontally elongated individual slots finishing flush with the leading edge thereof, said nozzles being arranged along substantially the entire span of said wings whereby to induce boundary layer air for the reduction of drag forces upon said aircraft, common manifolds extending spanwise of said wings and communicating with said nozzles for reception of airflow therefrom, said manifolds being curved at their inboard ends to form a common bifurcated conduit to direct said airflow rearwardly of said aircraft for the supply of said engine, an auxiliary air intake conduit extending forwardly of said bifurcated conduit for the delivery of supplementary air thereto, valve means arranged in said manifolds and auxiliary conduit operable to isolate said manifolds from air conducting assosition with said auxiliary conduit, and said nozzles flaring in vertical and outward relation forwardly thereof.

GEORGE A. WOODWARD, Jr.

REFERENCES CITED

The following references are of record in the file of this patent:

UNITED STATES PATENTS

| Number | Name | Date |
|---|---|---|
| 1,986,064 | Leray | Jan. 1, 1935 |

OTHER REFERENCES

"Aviation News," issue of Oct. 1, 1945, page 9.